United States Patent [19]
Stallfort et al.

[11] Patent Number: 5,609,387
[45] Date of Patent: Mar. 11, 1997

[54] LINING PANEL FOR A SLIDING ROOF FOR A VEHICLE

[75] Inventors: Klaus Stallfort, Maintal; Rainer Hattass, Gründau; Dieter Federmann, Hanau, all of Germany

[73] Assignee: Rockwell International GmbH, Germany

[21] Appl. No.: 576,145

[22] Filed: Dec. 21, 1995

[30] Foreign Application Priority Data

Dec. 30, 1994 [DE] Germany ............................ 44 47 014.2

[51] Int. Cl.$^6$ ........................................................ B60J 7/00
[52] U.S. Cl. ............................................. 296/214; 160/90
[58] Field of Search ................................. 296/214; 160/90

[56] References Cited

FOREIGN PATENT DOCUMENTS

| | | | |
|---|---|---|---|
| 640505 | 3/1995 | European Pat. Off. | ............... 296/214 |
| 4090924 | 3/1992 | Japan | ...................................... 296/214 |
| 6293220 | 10/1994 | Japan | ...................................... 296/214 |

*Primary Examiner*—Dennis H. Pedder

[57] ABSTRACT

A lining panel for a vehicle sliding roof the panel being formed as two parts namely a lining frame covered with a flexible, air-permeable sheet material, and a stiff lining plate. The lining plate constructed basically as a closed spatial structure, is disposed underneath the covered lining frame and can have, on its lower face material structure and/or colour corresponding to that of the vehicles main roof lining. The lining frame and lining plate are mounted displaceable relative to each other, so that the lining plate can be slid open towards the rear to allow light entry through a closed glass sliding lid independently of the sunshield formed by the lining frame covered by the sheet material.

7 Claims, 6 Drawing Sheets

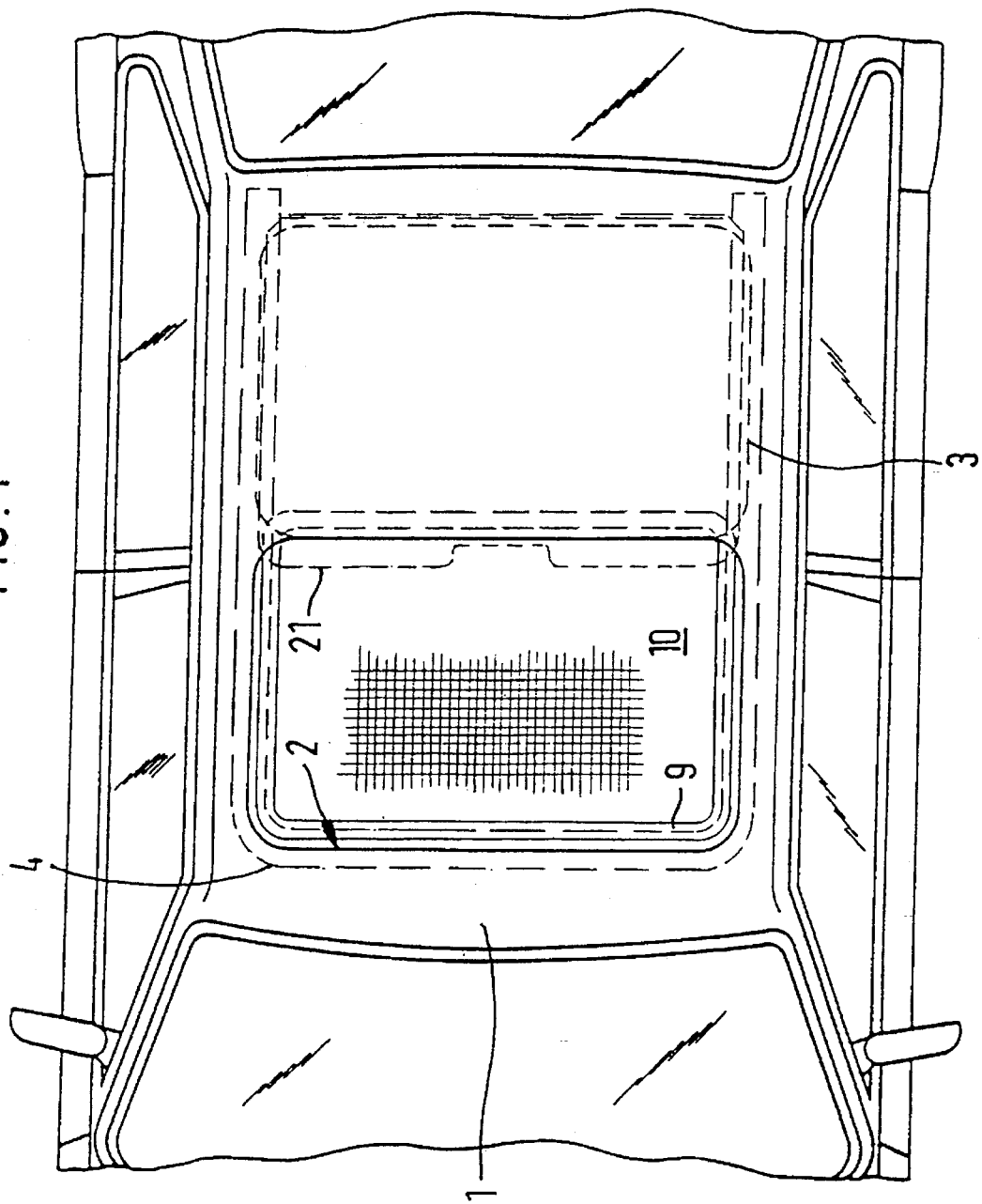

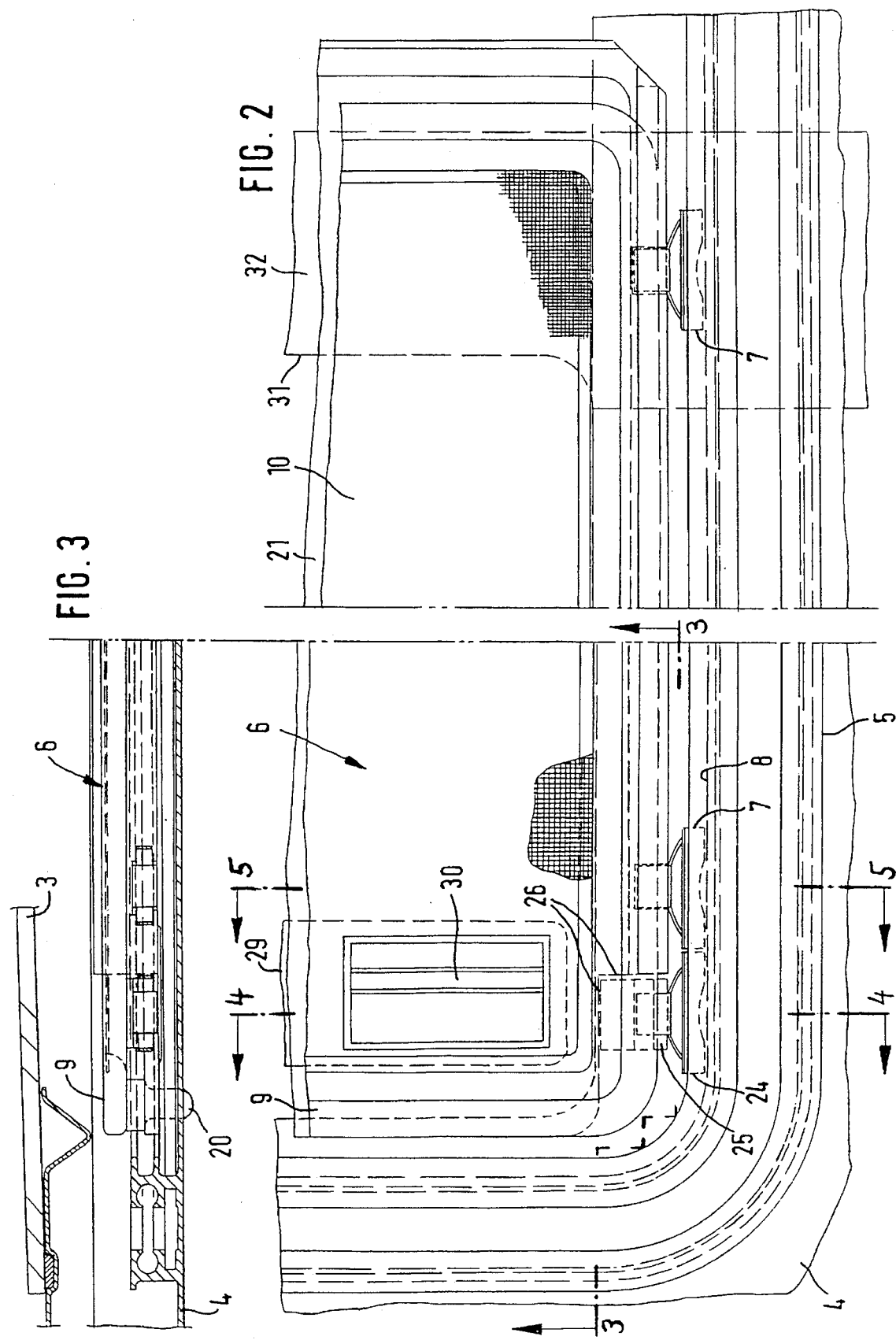

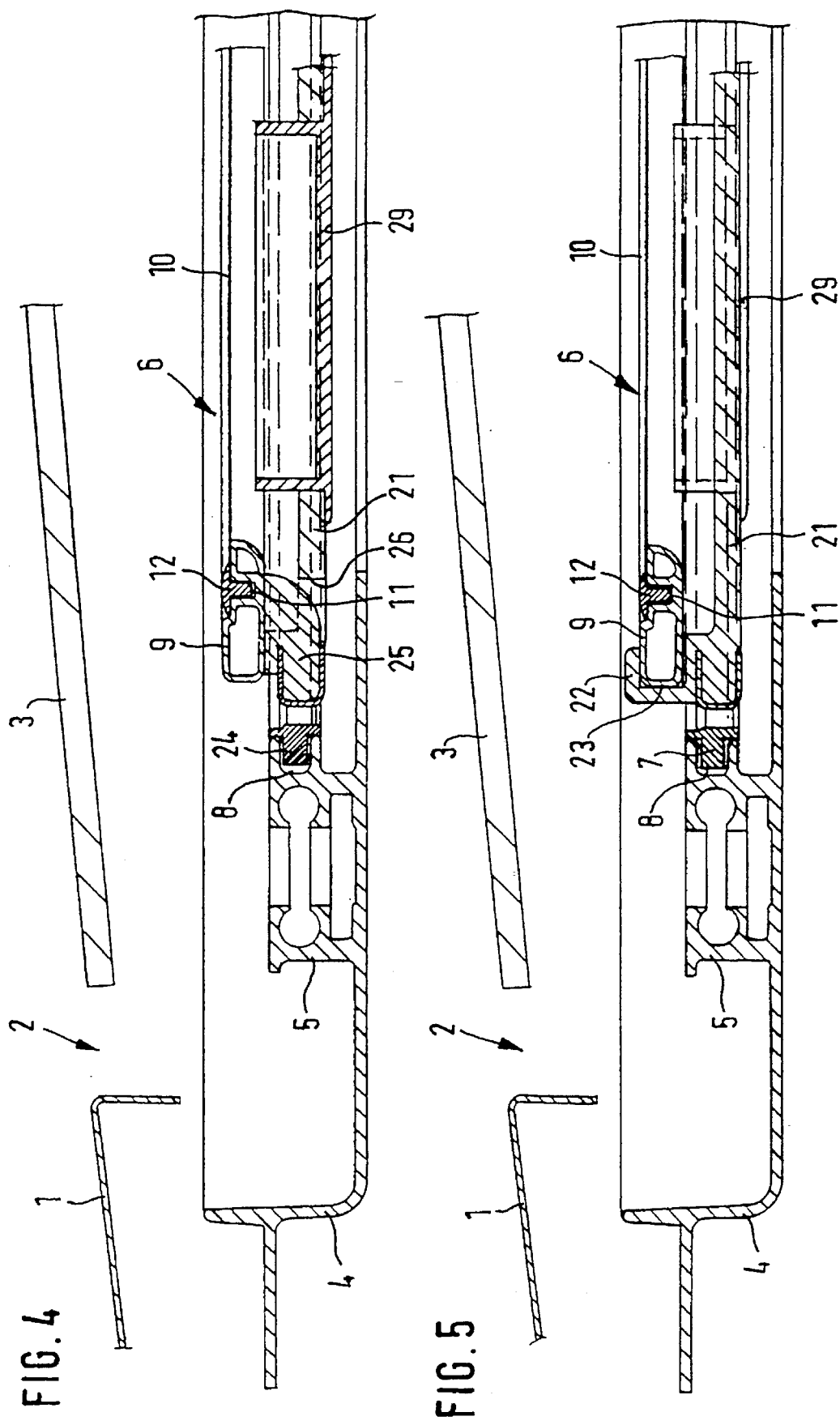

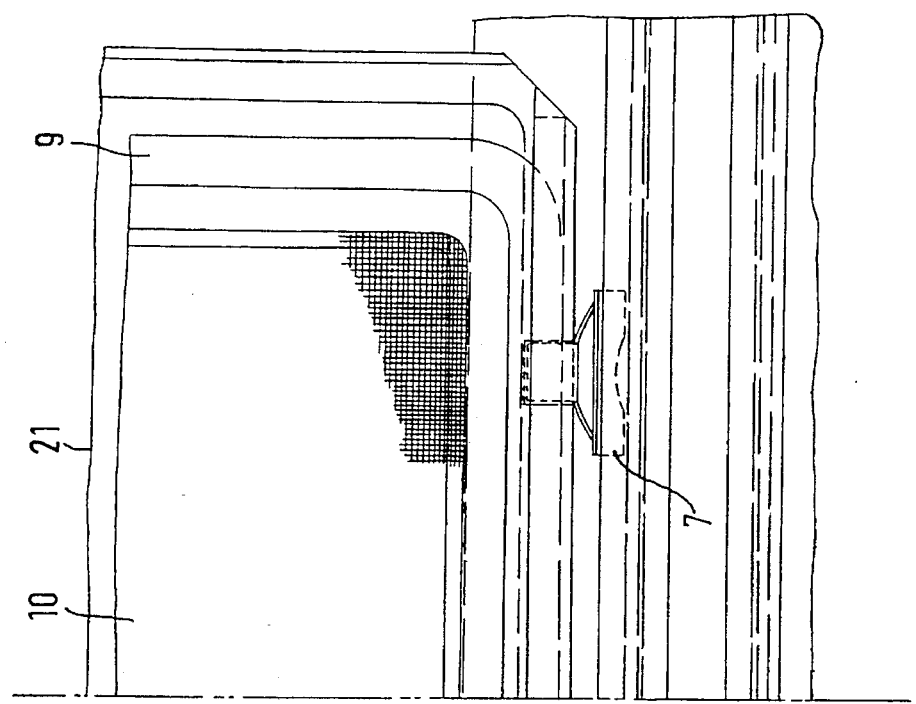
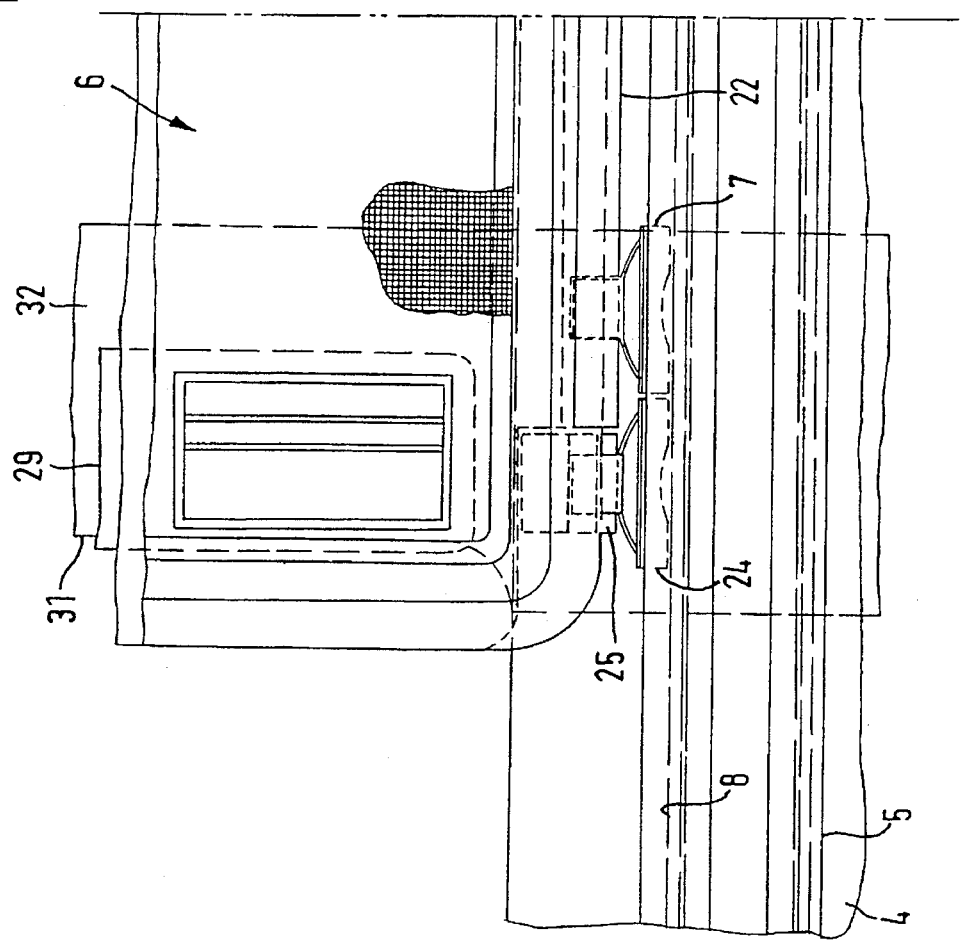
FIG.8

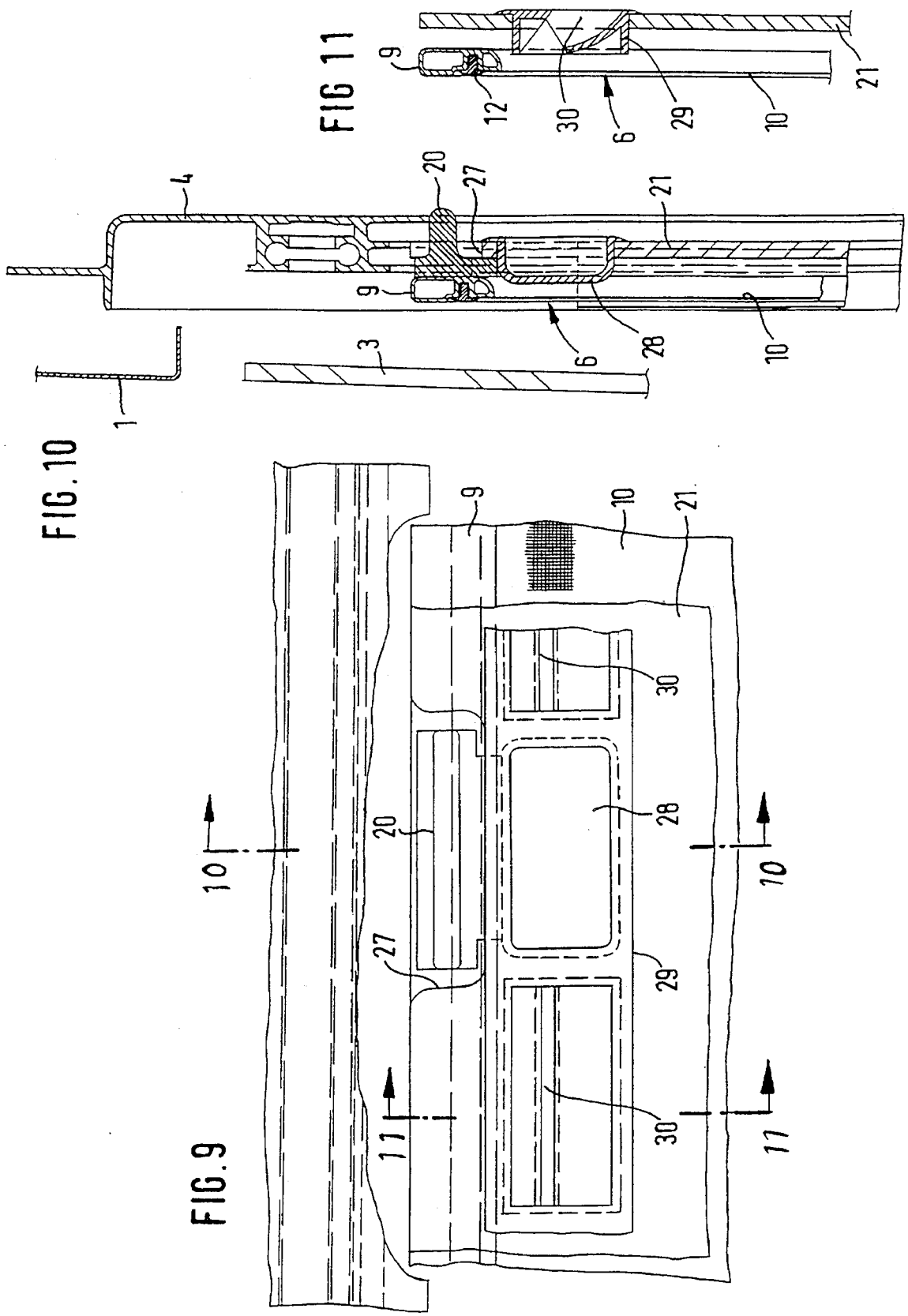

5,609,387

LINING PANEL FOR A SLIDING ROOF FOR A VEHICLE

TECHNICAL FIELD

This invention relates to a lining panel for a sliding roof for a vehicle particularly an automobile. The general term "sliding roof" used here is to be understood as meaning a sliding roof and a sliding-lifting roof, of which the lid associated with the roof opening, known here as "sliding lid", may be constructed as a sheet metal or glass lid.

BACKGROUND OF THE INVENTION

In the German Patent Application P 43 28 674.7, a lining panel is described, which not only offers protection against direct solar radiation and which allows good passage of air, but also has a simple and light construction whilst having a high bending strength, to resist uplift forces that occur when driving with the sliding roof open. To attain these properties, this lining panel has a stiff lining frame, which determines its external form and dimensions, and which is covered with a flexible, air-permeable sheet material.

The lining panel according to the above German Patent Application fulfils all the functional requirements regarding solar protection, air permeability, low weight, simple construction and bending stiffness, but its elements and surfaces that are visible from the vehicle interior can be considered annoying on account of the contrast to the fixed vehicle roof liner. It has been proposed in the German Patent Application to adapt the lower face of the flexible, air-permeable sheet material in its structure and/or colouring to the vehicle interior decoration, but nevertheless the lining panel, on account of the special structure of the covering sheet material that allows air permeability and of the lining frame visible from the vehicle interior, stands out from the remainder of the roof liner when the lining panel is closed.

SUMMARY OF THE INVENTION

A primary object of the present invention therefore is, to provide a lining panel which, while retaining all the functional characteristics of the lining panel of the aforesaid German Patent Application, can be adapted to The fixed roof lining in such a way that it no longer appears disturbing in its closed position.

The lining panel according to the present invention consists, essentially, of a covered lining frame and an additional lining plate, which is provided beneath the covered lining frame and basically is constructed as a closed spatial structure. The fabric-covered lining frame and the lining plate are slidable relative to each other. The lining plate can, in the closed position completely conceal the fabric covered lining frame, so that the latter is not visible from the vehicle interior. Since the lining plates may be constructed on its lower surface to correspond to the visible surface of the fixed roof liner, for example may be fabric covered, not only is the sunshield i.e. the covered lining frame, invisible when the lining panel is closed, but the opening in the fixed roof liner corresponding to the roof opening can be closed by the lining panel in a visually unremarkable manner.

The construction of the lining panel according to this invention offers, when a glass sliding lid is used, the additional advantage that, when the glass sliding lid is closed, not only is the solar protection displaced into its closed position, but also the lining plate can be displaced into its closed position. In this way the vehicle interior is completely covered against incident light through the glass sliding lid. Random intermediate positions with limited light incidence are, of course, also possible.

For the relative displaceability of lining frame and lining plate, these two elements of the lining panel are preferably in slidable engagement with each other at their lateral edges. It is advantageous here if the lining frame additionally is displaceably guided also on the lateral guide rails, in order that the fabric-covered lining frame also has sufficient lateral guidance when the lining plate has been entirely or partly displaced into its open position.

The lining plate and the fabric covered lining frame advantageously engage with one another for their mutual guidance by means of guide bars mounted on the two lateral edges of the lining plate. The guide bars are formed with mutually facing grooves in which lateral bars of the lining frame are seated.

Since the lining frame and the lining plate are at different vertical positions one above the other, but the guidance of the lining plate and the additional guidance of the lining frame in one embodiment take place in the same lateral guide rails, and also in the closed position of the lining panel the lining plate must lie flush at the front with the fabric covered lining frame, so that the lining plate can completely cover the lining frame, an advantage arrangement is that bearing blocks are mounted on the front on the lining frame so as to face each other. These blocks compensate for the difference in height and assure the additional guidance are mounted on the lining frame, which blocks, in the closed position, find a seating in correspondingly forwardly open cut-outs of the lining plate. Both the guides of the lining frame and also those of the lining plate, as well as their cut-outs and the bearing blocks, cannot be seen from inside the vehicle, if the roof frame, usual in sliding roof constructions of this type and also carrying the lateral guide rails, is provided, which overlaps the lateral edges of the lining panel.

Suitably for displacing the fabric-covered lining frame by hand, a downwardly projecting handle is fixed to a front transverse member of the lining frame which handle passes through a corresponding aperture in the lining plate. The aperture is advantageously adjacent to a gripping slot in the lining plate. The gripping slot serves for displacing the lining plate by hand. In order that, even when the lining panel is closed, ventilation of the vehicle interior with the sliding lid entirely or partly open or tilted out shall be possible, the gripping slot can, be part of or a component of a ventilation strip fixed to the lining plate.

BRIEF DESCRIPTION OF THE DRAWINGS

Further details of the invention are explained more closely with reference to a preferred example of embodiment thereof with the assistance of the drawings. In the drawings:

FIG. 1 is a partial view on a vehicle roof with sliding roof open and the fabric-covered lining frame situated in the ventilating and sun-protection position, with the lining plate opened, FIG. 2 is a partial plan view on the left side, as considered in the forward travel direction, of the sliding roof, with the lining panel closed with both its components, and the sliding lid not shown, FIG. 3 is a partial longitudinal section through the sliding roof along the multiple-cranked sectional 3—3 in FIG. 2, but with the sliding lid partly illustrated, FIG. 4 is a partial cross-section through the sliding roof along the line 4—4 in FIG. 2, FIG. 5 is a partial cross-section through the sliding roof along the line 5—5 in FIG. 2, FIG. 8 is a partial plan on the sliding roof in the region of the rear edge of the roof opening, with the lining panel completely open with both its parts, FIG. 9 is a partial view from below of the forward, central region of the lining panel completely closed with both its parts, FIG. 10 is a partial longitudinal section along the line 10—10 in FIG. 9, and FIG. 11 is a partial longitudinal section along the line 11—11 in FIG. 10.

DETAILED DESCRIPTION OF THE PREFERRED EMBODIMENTS

Figure 6:
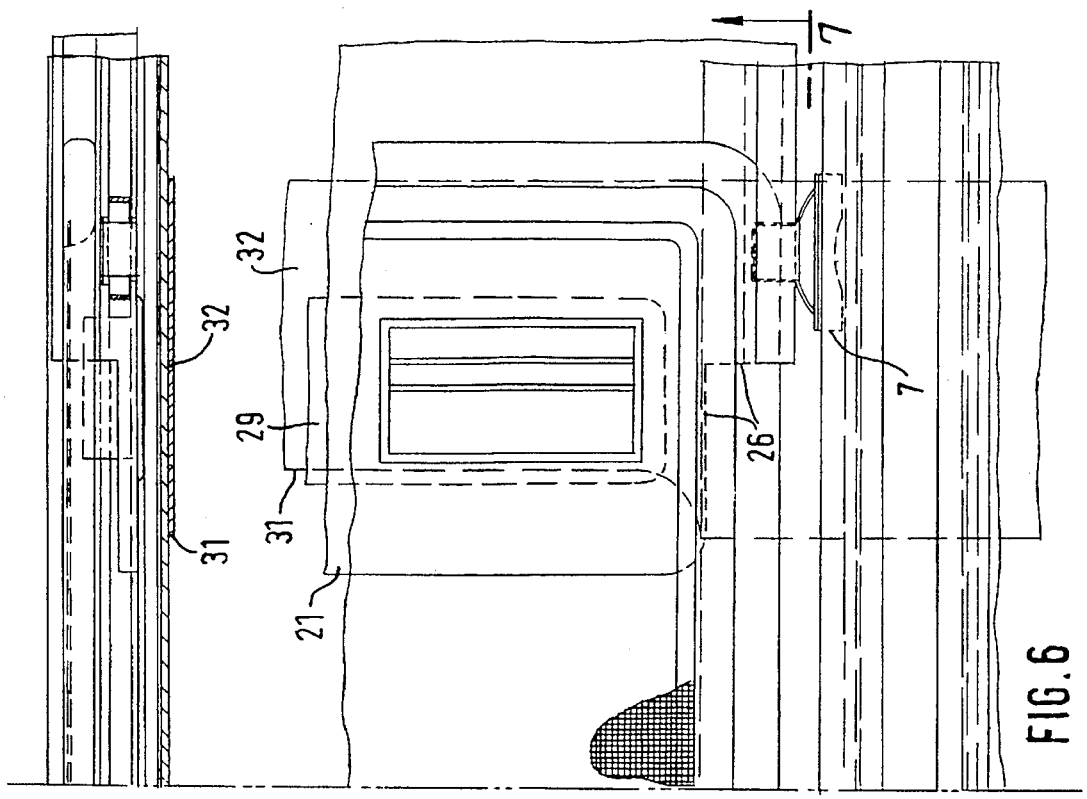
FIG. 6 is a partial plan on the sliding roof similar to FIG. 2, but corresponding to the illustration in FIG. 1, with the fabric-covered lining frame closed and the lining plate opened.

As can be seen front FIG. 1 in conjunction with, for example, FIG. 4, in a fixed vehicle roof 1 there is a roof opening 2, which, with the sliding roof closed, is closed by a sliding lid 3, associated displaceably with the opening. In the example shown, this is a glass sliding lid. Beneath the vehicle roof 1, there is a roof frame 4, surrounding the roof opening 2, which is connected in a manner not shown but already known firmly to the vehicle roof 1. The roof frame 4 is equipped with lateral guide rails 5, on which the sliding lid 3 is guided by guiding and pivoting-out elements, not illustrated here and not of interest here, but which otherwise are well known.

A lining panel, referenced generally 6, is slidably mounted on the guide rails 5. The lining panel, with its special construction and its guidance situation of the guide rails, is shown with only the left side as seen in the forward travel direction in FIGS. 2 to 8, the right side being of opposite hand. In FIGS. 2, 6 and 8, for simplifying the drawing, the vehicle roof, i.e. the roof plate, has been omitted.

The lining panel 6 engages, with guide shoes 7 mounted on it, slidably in a guide channel 8 situated laterally on the guide rail 5, as can be seen particularly from FIG. 5.

Basically the lining panel 6 is of two-part construction and consists of a fabric-covered lining frame 9 and a lining plate 21, which is provided underneath the covered lining frame 9 and is constructed as described later below. It will also be described that the fabric-covered lining frame 9 and the lining plate 21 are disposed slidable relative to each other.

The stiff liner frame 9 is covered with flexible, air-permeable material 10. As can be seen, for instance, from FIGS. 4 and 5, the lining frame 9 is provided, on its upper face, with an upwardly open clamping groove 11, which is continuous along all sides of the lining frame 9 as well as round the frame corners. Into the clamping groove 11, a clip-like clamping strip 12, which holds the sheet material 10 and fixes it to the lining frame 9, is pressed. The clamping strip 12 is also continuous around all the sides of the lining frame 9 and also around the corners, forms a single-piece clamping frame and is complementarily associated with the clamping groove 11. It has a T-shaped profile section, the web of which can be pressed into the clamping groove 11 with the material 10 between them, and the flanges of which, after this pressing-in, bear against the upper surface of the lining frame 9. In assembly, the sheet material 10 is cut approximately to the external size of the lining frame 9 and is laid on the upper face of this lining frame. The edges of the sheet material blank cover over the peripheral clamping groove 11, so that these edges, in the succeeding pressing-in of the web of the frame-like clamping strip 12, are gripped and pressed into the clamping groove. The sheet material 10 is thus biaxially tensioned in both directions simultaneously and covers the lining frame 9 tightly in the manner of a drum skin. It is also conceivable for the covered lining frame, which forms the sunshield, to be produced as a whole in one piece as an injection moulded component of plastics material. In the example shown, the lining frame 9 is made from an extruded hollow chamber profile, whereas the flexible, air-permeable sheet material 10 can be a textile woven fabric made from synthetic threads.

The lining plate 21, formed basically as a closed areal structure, which can be adapted on its lower face to the fixed roof liner (not shown) in its structure, appearance and colouring, is constructed as an intrinsically stiff plate, which gives a form stability to the lining panel 6, independently of the lining frame 9 covered with the sheet material 10. The lining plate 21 can, for this purpose, be injection moulded from glass fibre-reinforced plastics. The lateral guide shoes 7 are fixed in pairs opposite each other to the lining plate 21. To the two lateral edges of the lining plate 21, elongated guide bars 22 are fitted, which possess mutually facing guide grooves 23, which slidably receive the lateral bars of the lining frame 9. This situation is shown most clearly for one side of the sliding roof construction in FIG. 5. The covered lining frame 9 and the lining plate 21, which slidably engage with one another in the described manner at their lateral edges, together form the component known as the lining panel, which in accordance with its function can also be termed lid sliding liner. The guide shoes 7 are resiliently mounted on the lining plate 21, so that the lining panel 6 as a whole is guided free of chatter and tilting on the guide rails 5. Since, with the sunshield closed, i.e. with the covered lining frame 9 filling the roof opening, and with the lining plate 21 opened (FIG. 1, 6 and 7), the lining frame 9 is guided only in short sections of the guide bars 22, guide shoes 24 are additionally fitted to the lining frame 9 at the front, which are also resiliently constructed corresponding to the guide shoes 7 and also are slidably guided in the guide channels 8 of the guide rails 5. The mounting and construction of the front guide shoes 24 can be seen, for example, from FIGS. 2 and 4.

Since the lining frame 9 and the lining plate 21 are situated in different planes at different heights, special measures must be taken so that the forward guide shoes 24 of the lining frame 9 can engage into the guide channels 8. As can be seen most clearly from FIG. 4, for this purpose mutually opposite bearing blocks 25 are fixed to the underside of the lining frame 9, and carry on their outer side the guide shoes 24. The bearing blocks 25 are situated in the plane of the lining plate 21, and therefore cut-outs 26 are provided for the bearing blocks in the lining plate, on both forward sides of the lining plate 21. The cut-outs 26, of which only the left-side cut-out is shown in the plan views of FIGS. 2 and 6, are open towards the front. Because of these cut-outs 26, both the lining frame 9 and also the lining plate 21 can be displaced into the closed position of the lining panel 6, flush with each other at the front (FIG. 2).

Figure 7:
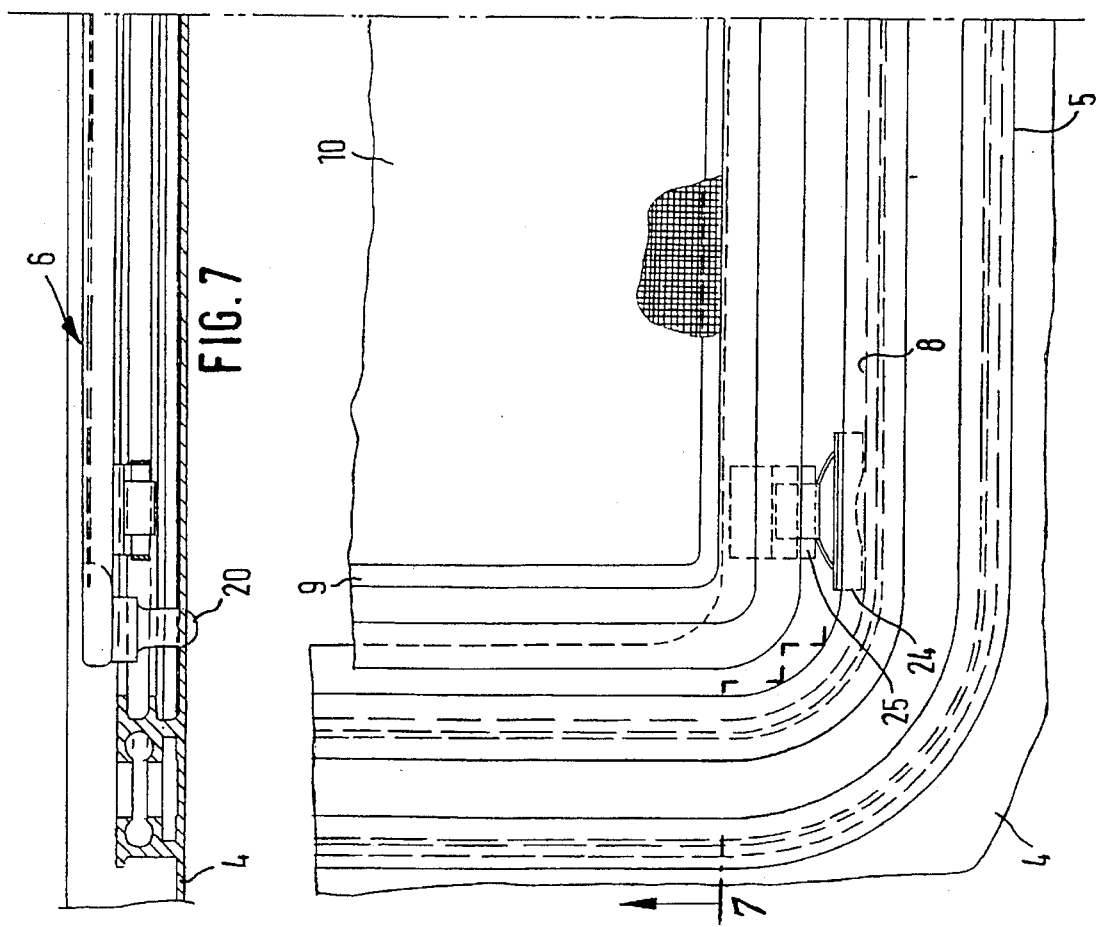
FIG. 7 is a partial longitudinal section through the sliding roof along the multiple-cranked section line 7—7 in FIG. 6.

On the front transverse bar of the lining frame 9, a handle 20, projecting downwards, is fixed, as can be seen from FIGS. 3, 7 and 10. The handle 20 projects also beyond the lining plate 21, penetrating, when the lining panel 6 is closed, through a forwardly open aperture 27 in the lining plate 21 as shown in FIGS. 9 and 10. Adjacent to the aperture 27, a gripping slot 28 is provided in the lining plate 21. In the example shown, the gripping slot 28 is a part of the ventilating strip 29, which is recessed into the lining plate 21 in the region of its front edge and fixed to it. The ventilating strip 29 possesses, on either side of the gripping slot 28, several air passage slits 30. The fixing base, not further referenced, of the handle 20 is so mounted that the front, outer wall of the gripping slot 28 bears against it when the lining plate 21 is fully pushed forwards relative to the lining frame 9. The handle 20 can, in the closure displacement of the lining panel 6 meet the edge of the forward transverse part of the roof frame 4, thus limiting the travel of the lining panel, as shown in FIG. 10. FIGS. 9 and 10 also illustrate that, when the lining plate 21 is closed, the sunshield consisting of the lining frame 9 and the sheet material 10 is no longer visible from the vehicle interior. In this way, the visual impression of an entirely uniform vehicle roof liner is given.

For opening the lining panel 6, this panel can be displaced backwards infinitely variably by means of the handle 20 beneath the fixed vehicle roof 1. The lining plate 21 is entrained thereby by the bearing of the base of the handle 20 against the front outer face of the gripping slot 28. The opening displacement is completed when the handle 20 has reached a position in front of the rear edge of the opening defined in the fixed roof liner. This rear edge approximately coincides with the front edge 31 of a transverse member 32 (FIGS. 6 to 8) that stiffens the two lateral parts of the roof frame together. In this position the lining plate 21 can be secured to the guide rails by a detent device, not shown. If required, the sunshield can then be pulled forwards by the handle 20 until, as shown in FIG. 10, the handle 20 strikes the front transverse portion of the roof frame 4. In this position, the lining plate 21 can, for the purpose of reducing the light incidence through the glass lid and through the sunshield, be pulled forwards out of its engaged position by means of the gripping slot 28 in movement relative to the closed sunshield, until the front outer surface of the gripping slot 28 strikes the handle 20 of the sunshield.

If the sliding lid is moved backwards out of its closed position (FIGS. 2, 3 and 9, 10) to expose the roof opening 2, it can, by means of a coupling, not illustrated here but usual in known sliding liner arrangements, positively entrain the lining panel 6 comprising its two parts as far as a position in which the gripping slot 28 of the lining plate 21 is situated behind the front edge 31 of the transverse member 32 and thus outside the field of view. The handle 20 of the sunshield is, however, still situated in front of the front edge 31 and therefore can be reached by the hand of the user. Since the lining panel 6 is held in this position by the opened sliding lid 3, the sunshield can then be pulled forwards into its closed position by means of the handle 20. If the sliding lid 3 is afterwards displaced towards closure, it positively entrains the lining plate 21 forwards by means of the aforementioned coupling.

The aforesaid embodiment of the invention provides a substantially two part lining panel, consisting of a lining frame covered with a flexible, air-permeable sheet material, and a stiff lining plate, is proposed. The lining plate, formed basically as a closed spatial structure, is disposed underneath the covered lining frame at a small distance therefrom and can be given a construction on its lower face adapted to the fixed roof liner in material, structure and colour. The lining frame and lining plate are guided displaceably relative to one another and on one another, so that the lining plate can be slid open towards the rear to allow light to enter through a closed glass lid independently of the sunshield formed from the covered lining frame and the sheet material.

Although the invention has been shown and described with respect to a preferred embodiment thereof, those skilled in the art should understand that various changes and omissions of form and detail thereof may be made without departing from the spirit and scope of the invention.

We claim:

1. A lining panel for a vehicle sliding roof, said sliding roof being arranged to displaceably open and close a roof opening, said lining panel being slidably mounted beneath a sliding lid of the sliding roof, said lining panel displaceably associated with the roof opening and mounted on at least two laterally spaced guide rails, said lining panel comprising a stiff lining frame covered with a flexible air-permeable sheet of material, wherein said lining panel further comprises an additional lining plate, said lining plate located beneath the covered lining frame, wherein the covered lining frame and the lining plate are disposed displaceably relative to each other, and wherein the covered lining frame and the lining plate further each have two lateral edges and wherein the covered lining and the lining plate engage each other slidably at said lateral edges.

2. A lining panel according to claim 1 wherein the lining frame has a front, and wherein the lining frame is additionally displaceably guided by projecting structure at the front upon the lateral guide rails.

3. A lining panel according to claim 1 wherein, on the two lateral edges of the lining plate, guide bars are mounted, said guide bars including mutually facing guide grooves, into which slidably seat lateral bars of the lining frame.

4. A lining panel according to claim 2 wherein said structure comprises at least two bearing blocks are mounted at the front of the lining frame, wherein said lining plate has at least two cut-outs and wherein said blocks each engage into a corresponding one of said cut-outs and wherein each of said blocks are displaceably mounted in a corresponding one of said guide rails, each said block including a guide shoe.

5. A lining panel according to claim 1 wherein said lining frame includes a front transverse member, and wherein a downwardly projecting handle is fixed to said front transverse member wherein, when the lining panel is closed, said handle passes through a forwardly open aperture in the lining plate.

6. A lining panel according to claim 5 wherein a gripping slot is provided in said lining plate adjacent to the aperture.

7. A lining panel according to claim 6 wherein said lining plate has a front region, and wherein the gripping slot is provided on a ventilation strip, said ventilation strip being fixed to said lining plate at said front region.

* * * * *